United States Patent Office 3,532,937
Patented Oct. 6, 1970

3,532,937
SOLID STATE CIRCUIT BREAKERS
George Wellesley Pritchard, Hayes, Gordon Spencer Chandler, London, England, assignors to Booth Engineering Limited, Weybridge, Surrey, England, a British company
Filed Sept. 1, 1967, Ser. No. 665,151
Claims priority, application Great Britain, Sept. 2, 1966, 39,295/66
Int. Cl. H02h 7/00, 5/00
U.S. Cl. 317—33    12 Claims

ABSTRACT OF THE DISCLOSURE

This invention provides a solid state circuit breaker employing one or more solid state switching elements such as Thyristors for controlling the current flowing between a source of current and a load, the switching element or elements being controlled by control circuit means including current overload sensing means to provide an output signal to trip the circuit breaker if the load current exceeds a predetermined value. The circuit breaker is particularly suited for use in direct current circuits but may be adapted for use in an alternating current circuit by connecting the circuit breaker across the direct current output terminals of a bridge rectifier circuit and connecting the bridge rectifier in series with a source of alternating current and the A.C. load. The contol circuit means may also include resistance measuring circuit means by which the load resistance is measured before the circuit breaker is closed to prevent the circuit breaker from switching into a short circuit.

---

This invention concerns circuit breakers which employ solid state switching elements.

According to the broadest aspect of the present invention a solid state circuit breaker for making and breaking a circuit between a source of direct current and a D.C. load comprises two solid state switching elements connected in series with the source and the load, first control means including resistance measuring means for preventing one of the switching elements from conducting if the load resistance is below a preselected value and second control means including current measuring means for actuating the other switching element into its nonconducting state if the current flowing through the load exceeds a preselected value.

Conveniently the solid state switching elements are silicon controlled rectifiers or thyristors and each switching element may comprise one or a number of thyristors connected in series and/or parallel. Alternatively some of the switching elements may comprise power transistors.

According to another aspect of the invention a circuit breaker embodying the invention may be adapted to make and break a circuit between a source of alternating current and an A.C. load by replacing the D.C. load with a load of very low resistance and connecting the circuit breaker between the output terminals of a rectifier circuit connected in series with the alternating current source and A.C. load. The one switching element can be prevented from conducting unless the A.C. load is greater than a preselected resistance by including the A.C. load in the resistance measuring means and since the current flowing in the very low resistance D.C. load is equal to the current flowing in the A.C. load, the other switching element can be actuated into its nonconducting state if the load current exceeds a preselected value.

According to a further apsect of the invention a circuit breaker embodying the invention for switching alternating current, comprises at least one bridge rectifier circuit whose A.C. input terminals are connected in series with the A.C. load and with a load current sensing means, with at least one thyristor connected across the D.C. output terminals of the bridge, the gating electrode of the thyristor being connected to the output of a pulse generator the operation of which is controlled by first and second control circuit means the first control including first switch means for actuating the generator and second switch means for switching off the generator and the second control being responsive to the load current sensing means to cut off the generator if the load current exceeds a predetermined value and switch means by which the generator can be switched into an operative state, to reset the circuit breaker.

The invention will now be described further by way of example with reference to the accompanying drawings in which.

Figure 1:
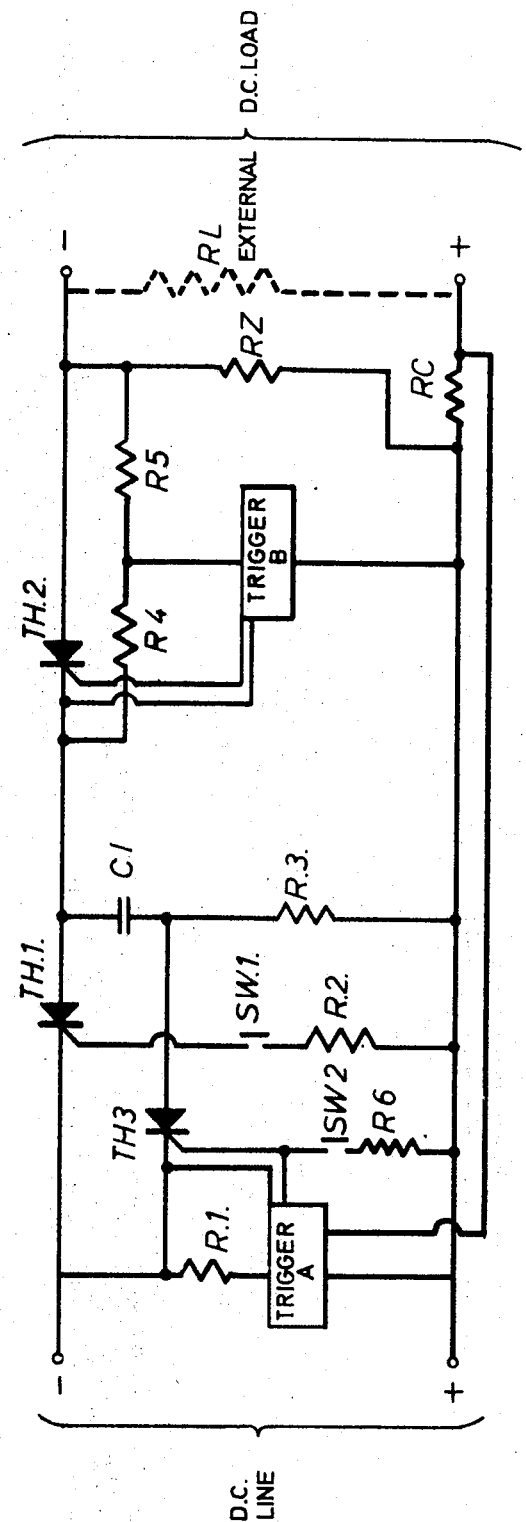
FIG. 1 is a partly schematic circuit diagram of a solid state circuit breaker embodying the invention.
Figure 2:
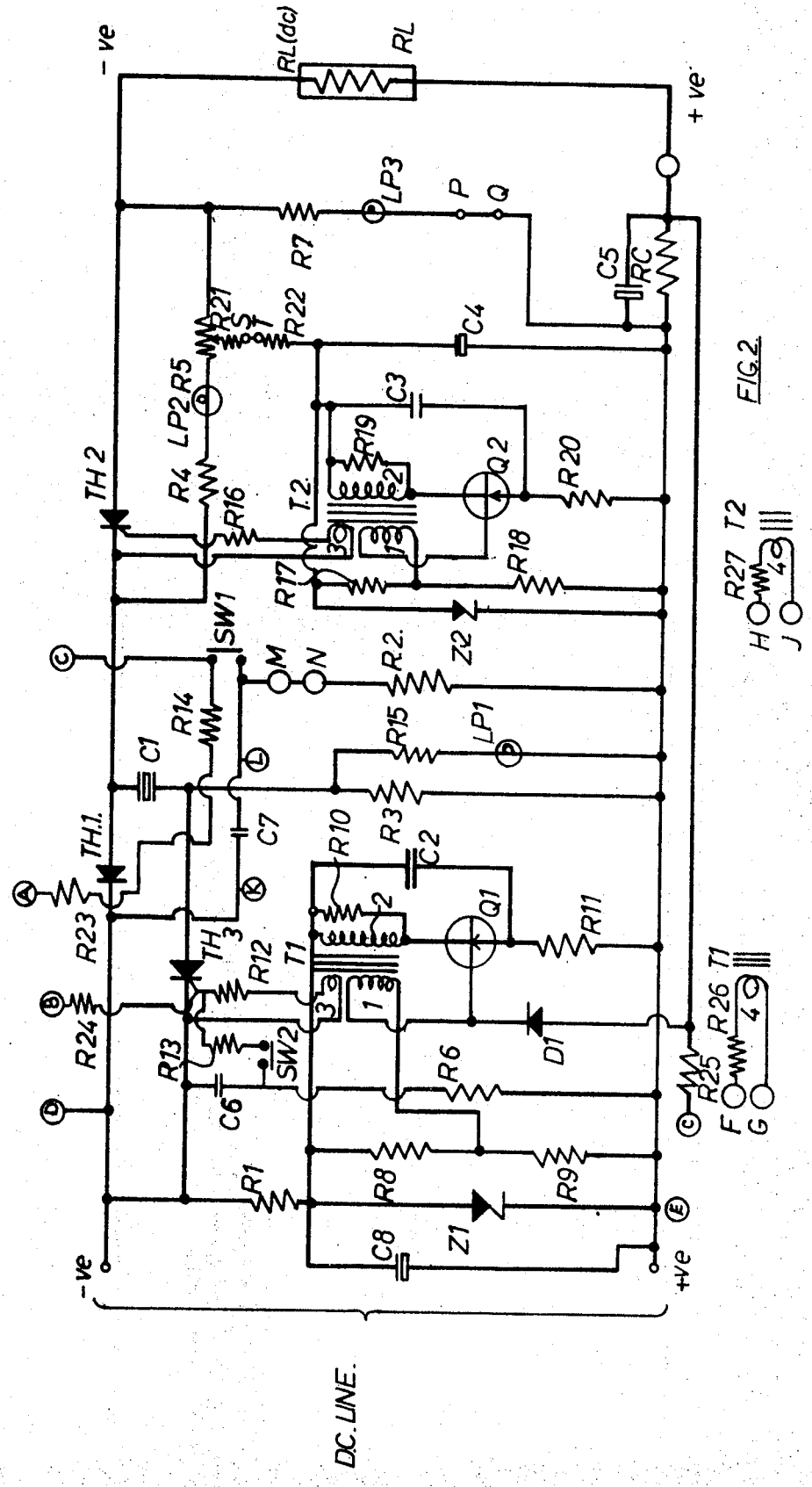
FIG. 2 is a circuit diagram of the circuit breaker of FIG. 1 in which the schematic portions have been replaced by detailed circuits.

The solid state circuit breaker illustrated in FIGS. 1 and 2 serves to make and break a circuit between a source of direct current, indicated as D.C. line and a direct current load, indicated as D.C. load. The circuit contains two solid state switching elements TH1 and TH2 connected in series with the direct current source and the D.C. load, the remainder of the circuit functioning to prevent the circuit from being closed during fault conditions and to break the circuit on overload. It will be seen that the circuit is made only when both TH1 and TH2 are triggered into conduction and is broken if either TH1 or TH2 is cut off.

In the circuit illustrated the switching elements TH1, TH2 are silicon controlled rectifiers or thyristors.

TH1 is triggered into conduction by applying a positive pulse to the trigger electrode via switch SW1 and current limiting resistor R2 connected to the positive D.C. line. The conduction of TH1 causes capacitor C1 to be charged to the D.C. line potential through resistor R3.

TH1 is cut off by applying the full D.C. line potential in reverse momentarily between its anode and cathode. This is achieved by connecting a silicon controlled rectifier or thyristor TH3 between the negative D.C. line and the junction of C1, R3 and triggering TH3 into conduction when it is required to cut off TH1. This is done by closing SW2 and applying a positive trigger pulse to the trigger electrode of TH3 through resistor R6 connected to the positive D.C. line. When TH3 conducts, C1 is effectively connected directly in parallel with TH1 and this causes the full D.C. line potential to which C1 is charged, to be applied reversely across TH1.

It will be seen that TH3 is cut off as soon as TH1 conducts again, since whilst TH3 conducts C1 is oppositely charged to the D.C. line potential through TH3 and the resistive network R4, R5, RZ, and when TH1 conducts this potential is applied reversely across TH3.

TH2, connected in series with TH1 is made to conduct by application of a positive trigger pulse to its trigger electrode from a pulse generator circuit identified as Trigger B. It will be seen that resistors R4, R5 and, ignoring $R_c$ and $R_L$, $R_Z$, constitute a potentiometer across which the D.C. line voltage appears when TH1 conducts. The pulse generator, Trigger B is arranged to produce a positive trigger pulse if the potential of the junction of $R_4$, $R_5$ is more negative than a preselected value and this positive trigger pulse is applied to $TH_2$ to cause it to conduct. When a load $R_L$ is connected to the circuit breaker, it appears as a resistance in parallel with the resistor $R_z$. This reduces the effective ohmic resistance of $R_z$ and consequently increases the proportion of the line voltage which is dropped across R4 which results in the potential of the junction of $R_4$, $R_5$ becoming more positive. By arranging that the preselected potential of this junction is attained by a value of $R_L$ substantially commensurate with the resistance of the load, a low resistance path or short circuit in the load will be detected and no trigger pulse will be generated to fire TH2.

In order to detect an undesirable increase in the load current during operation, a second trigger pulse generator is provided identified by Trigger A. This second pulse generator is arranged to produce a positive trigger pulse when the current flowing through the load $R_L$ exceeds a preselected value. This is achieved by connecting a resistor $R_c$ having low ohmic resistance, in series with the load $R_L$, sensing the potential of the junction of $R_c$ and $R_L$ and causing Trigger A to produce a positive trigger pulse when the potential of this junction exceeds a preselected negative value in the negative direction. The positive trigger pulse is applied to the trigger electrode of TH3, which as hereinbefore described causes TH3 to conduct and TH1 to be extinguished. With the extinguishing of TH1, capacitor C1 again charges via TH3 and R4, R5, etc. and TH3 is extinguished.

FIG. 2 illustrates the solid state circuit breaker of FIG. 1 in greater detail and where appropriate the same reference numerals and symbols have been used to identify the same components.

The standard D.C. commutator circuit is made up of TH1, TH3, C1, R3. Capacitor C1 comprises two large capacity electrolytic capacitors, connected back to back to provide for the reversal of polarity when charging through TH1 or TH3. R3 is bypassed by a resistor R15 in series with a lamp LP1, which lights when TH1 conducts and indicates the normal or "OFF" condition.

The manual triggering circuit of TH3 comprises a resistor R6 and capacitor C6 connected in series across the D.C. supply, and a surge limiting resistor R13 in series with the switch $SW_2$ connected between the junction of R6, C6 and the trigger electrode of TH3. C6 charges via R6 to a polarity +ve with respect to the anode of TH3 and on closing $SW_2$, C6 discharges via R13 into the trigger electrode or gate of TH3. The total resistance value of R6, and R13, is arranged to be such, that TH3 will not trigger direct from the positive rail. Therefore TH3 will receive one short pulse only when SW2 is closed.

The manual triggering circuit of TH1, is similar to that of TH3 and comprises capacitor C7, resistors R14, R2, and switch SW1.

The pulse generator for automatically triggering TH3 and identified in FIG. 1 as Trigger A takes the form of a blocking oscillator comprising the following components transistor Q1, transformer T1, resistors R10, R11, R8, R9 and capacitor C2. The oscillator is supplied with current from an auxiliary negative line which is regulated by resistor R1, and Zener diode Z1. The capacitor C8 constitutes a reservoir capacitor and prevents the blocking oscillator from triggering on ripple or transients that may appear on the main negative line.

Resistors R8, R9, form a potential divider and provide bias to the base of Q1, via base winding No. 1 on transformer T1, while capacitor C2 and emitter resistor R11 control the frequency of the oscillator. An output of positive going pulses is taken from winding No. 3 on T1 and is applied to the gate of TH3 via resistor R12. Resistor R12 is for current limiting purposes only.

The circuit is prevented from oscillating by a diode D1, which is connected between the base of Q1 and the junction of Rc and $R_L$ which (since $Rc \ll R_L$ under normal conditions) is therefore substantially at the positive D.C. line potential. However when current is drawn through Rc by the load RL the junction of Rc and $R_L$ becomes less positive and if this junction becomes more negative than the base of Q1, the diode blocks and the oscillator is allowed to oscillate until the voltage across Rc disappears or is reduced. Therefore as the voltage across Rc is in proportion to the current drawn by $R_L$, $TH_3$ is immediately caused to conduct when this current exceeds a certain value, i.e. $TH_3$ is made to conduct and switch off TH1, as soon as the current flowing in RL exceeds a certain preselected value. It will be seen that as soon as TH1 and TH2 are cut off the voltage across $R_c$ disappears thereby grounding the base of Q1, and returning Trigger A to its normal nonoscillating condition.

Trigger B for triggering TH2 is similar to Trigger A but is formed from transistor Q2, transformer T2, capacitor C3, and resistors R19, R20, R17 and R18. Trigger B is however supplied from the slider of resistor R5 and is not allowed to exceed a selected voltage by use of a Zener diode Z2. The operation of Trigger B is identical to that of Trigger A except that the base of Q2 is not normally grounded by a diode.

Once TH1 is conducting the line voltage appears at the cathode of TH1 and the anode of TH2, but TH2 cannot conduct until triggered. Current is drawn by RL, through the potential divider chain: R4, LP2 and preset resistor R5. Resistor R7 and LP3 are in parallel with RL but may be ignored temporarily as their value greatly exceeds RL.

The potential divider chain R4, LP2, R5, etc. is arranged to pass sufficient current to illuminate LP2, thereby showing a fault condition. A voltage is taken off the potential divider chain from the slider of the preset resistor R5 and as hitherto explained the potential of this point is dependent on the ohmic value of RL. The current required by Trigger B is derived from this point via resistors R21, R22, and Trigger B is arranged to not produce pulses until its supply rail reaches a preselected voltage—a Zener diode circuit may be incorporated at this point for more critical applications. Capacitor C4 is charged via R21, R22 and the time constant of this charging network is arranged to be such as to prevent transient pulses from being transmitted to Q2, and thereby causing unwanted pulses to appear at the gate of TH2.

Assuming that a high enough voltage appears at the slider of preset resistor R5, and also at the junction R22, C4, trigger unit B will apply pulses to TH2, via R16 causing it to conduct. This causes R4, LP2, and preset R5, to be short circuited by TH2 and LP2 is extinguished. The slider of preset R5 now attains a potential just less than the full line voltage, but the negative supply for line Trigger B is protected from exceeding the desired working voltage by Zener diode Z2, and therefore continues to supply pulses to TH2.

As soon as TH2 conducts and the D.C. line voltage appears across load RL it must appear simultaneously across resistor R7, and lamp LP3, therefore lamp LP3 lights and indicates the load "ON" or live condition. It is conveniently arranged that R7, LP3 will draw sufficient current to maintain conduction in the absence of load RL.

The capacitor C5 across resistor Rc serves to absorb short transients occurring in the load, and prevents them from producing voltage spikes at the junction of D1, Rc, which would momentarily block, D1 and cause Trigger A to produce pulses for switching off TH1 and TH2.

Figure 3:
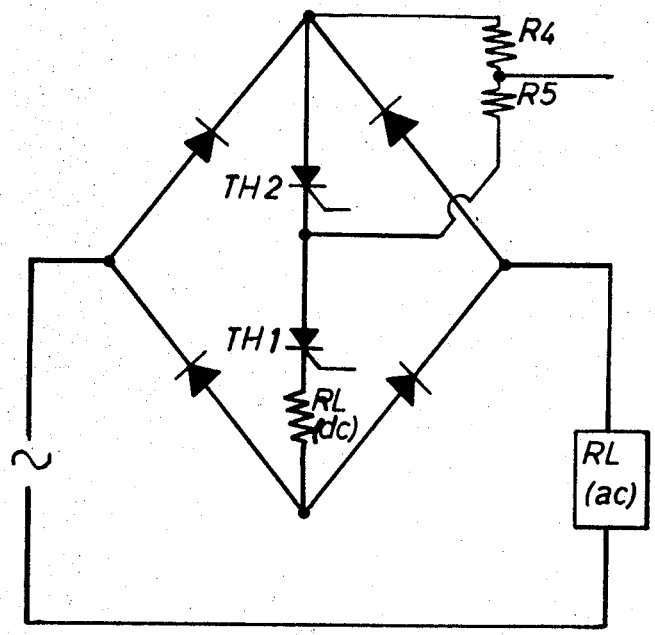
FIG. 3 is a circuit diagram which illustrates how a solid state circuit breaker can be adapted to switch alternating current.

FIG. 3 illustrates how a solid state circuit breaker of the type illustrated in FIGS. 1 and 2 can be adapted for switching alternating current.

The diodes D1, D2, D3, D4 are arranged to form a standard full wave bridge in series with the A.C. supply and A.C. load. If no current is drawn from the D.C. side of the bridge, the bridge presents an open circuit between the supply and load. On the other hand if direct current is drawn from the D.C. side of the bridge, this is reflected into the A.C. side. Ignoring losses the magnitude of the direct current will be the same as the alternating current. The alternating current can therefore be switched on and off by presenting a short circuit or open circuit respectively to the D.C. side of the bridge, and a solid state circuit breaker having a short circuit load ($R_L=0$) can be arranged to do this by connecting it to the D.C. output of the bridge as illustrated in FIG. 3.

If TH1 conducts and TH2 is still blocked, current is drawn via TH1 through R4, R5 and $R_L$ (D.C.) the magnitude of this current being therefore dependent upon the ohmic value of the A.C. load $R_L$ (A.C.) and therefore a measure of the A.C. load. It follows that one can obtain a voltage from the junction of R4, R5 refer it to a standard and determine the likely current that will flow in the A.C. load before triggering TH2. In practice $R_L$ (D.C.) would be a short circuit, and when both TH1 and TH2, conduct the D.C. side of the bridge is a virtual short circuit and the full alternating voltage and current are available for the A.C. load $R_L$ (A.C.).

Since the voltage across the D.C. side of the bridge becomes zero every half cycle, the thyristors TH1, TH2 will immediately return to their normal blocked condition unless arrangements are made to ensure their continued conduction. For example TH1 and TH2 may be retriggered at the beginning of each half cycle, or a continuous D.C. voltage may be supplied to the gates of TH1 and TH2, or a reservoir capacitor may be connected across the D.C. terminals of the bridge, the capacity of this reservoir being such that sufficient voltage and current are available to maintain conduction of TH1 and TH2, as the voltage between the D.C. terminals of the bridge passes through zero.

Conversely, the thyristors TH1, TH2 may be extinguished by, stopping retriggering, when the bridge will block at the end of the appropriate half cycle, or removing the continuous D.C. trigger voltage when the bridge will again block at the end of the appropriate half cycle, or using a third thyristor in a D.C. commutating circuit in conjunction with TH1.

In order to prevent current overloads a current sensing resistor may be inserted in series with TH1, TH2, across the D.C. terminals of the bridge. Alternatively a current sensing resistor may be inserted in series with the bridge and the A.C. load, $R_L$ (A.C.) or the primary winding of a current transformer may be inserted in series with the bridge and the A.C. load $R_L$ (A.C.). The output from each of these current sensing devices is applied to the Trigger A after suitable processing, and as hereinbefore described, Trigger A is arranged to supply triggering pulses to TH3 if the current exceeds a preselected value.

The system described above will be seen to be equally applicable to polyphase supplies of any type and also to earth current sensing systems. Separate control circuits for each phase or a common control for all the phases may be used.

It will be seen that by virtue of the nature of the circuits controlling the switching elements (silicon controlled rectifiers), two or more solid state circuit breakers embodying the invention may be interconnected to perform logic operations or to receive or supply, directly, logic information from or to external logic circuits. For example a solid state circuit breaker will refuse to switch into a short circuit. Likewise it will immediately switch OFF if a short circuit occurs either at the instant of switching ON, or sometime after it has been switched on.

Although TH2 has been shown and described as a silicon controlled rectifier or thyristor it could be replaced by a power transistor capable of handling the high currents involved. Furthermore although only one thyristor has been shown at each switching station, TH1 and TH2 could easily be replaced by a number of thyristors connected in parallel and/or series to provide for any desired current and/or voltage which it is required to switch. Likewise, the diodes D1 to D4 in FIG. 3 could each be replaced by a number of diodes connected in appropriate parallel or series (or both) arrangements to provide for any desired A.C. values.

Figure 4:
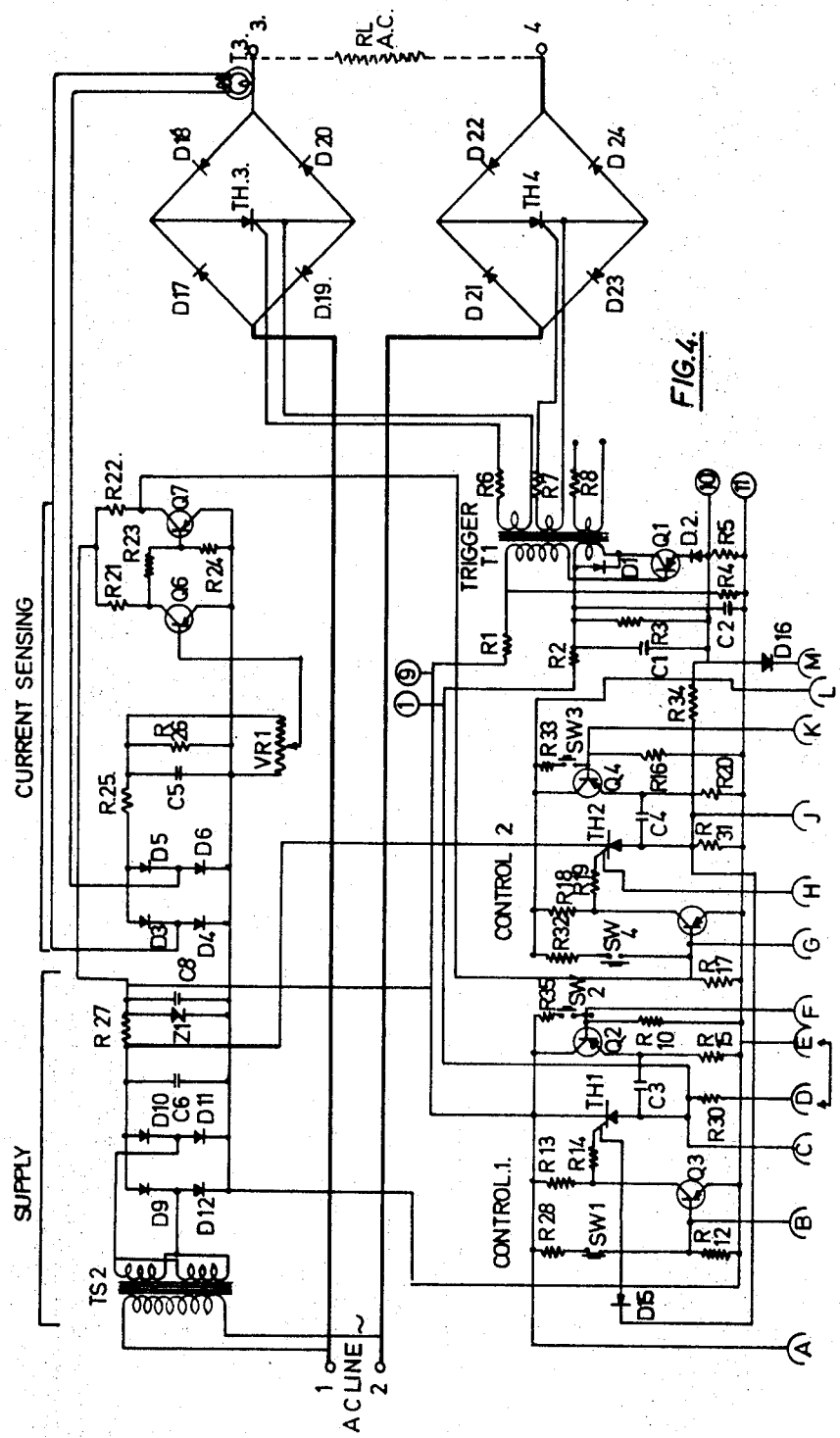
FIG. 4 is a circuit diagram of an alternative embodiment of circuit breaker adapted to switch alternating current.

In FIG. 4 there is illustrated a modified circuit breaker for use with a single phase A.C. supply, two bus-bars of which are indicated from terminals 1 and 2 in the drawing. The circuit breaker is composed of seven parts,
(i) a power supply unit,
(ii) a current sensing unit,
(iii) a first trigger control circuit including thyristor TH1 and transistors Q2 and Q3,
(iv) a second trigger control circuit including thyristor TH2 and transistors Q4 and Q5,
(v) a blocking oscillator including transistor Q1 to produce pulses for triggering and firing the load current thyristors TH3 and TH4, and (Vi) and (Vii)—two A.C. bridge rectifier circuits (D17–D20 and D21–24) connected with their A.C. inputs in series with the two A.C. supply lines between terminals 1 and 3 and 2 and 4 with the thyristors TH3 and TH4 connected across their D.C. outputs.

The power supply unit comprises a transformer TS2 connected with its primary across the A.C. supply 1,2 and its secondary connected to a bridge rectifying circuit D9–D12. The D.C. output from the bridge D9–D2 is smoothed by capacitor C6 and further smoothed by resistor R27 and capacitor C8 and regulated by Zener diode Z1.

The current sensing unit comprises an A.C. bridge D3–D6 which derives an A.C. input from the secondary winding of a current transformer T3 and whose D.C. output is applied to an RC network comprising R25, R26, and C5. A potentiometer VR1 is connected across the capacitor C5 and the slider of the potentiometer series to supply base bias to a transistor Q6 forming the normally cut off transistor of a pair connected as a Schmitt trigger Q6,Q7. It will be appreciated that the voltage to which C5 is charged is proportional to the curren flowing in the primary of the current transformer T3. VR1 controls the proportion of this voltage applied to the base of Q6 and provides an adjustment of the current level at which Q7 is caused to conduct. By the Schmitt trigger action, Q7 is cut off when Q6 conducts thereby supplying base bias to the base of Q5 to which the collector of Q7 is connected.

It will be further appreciated that not only can the current level at which Q6, Q7 triggers, be adjusted, but so also can the time for a given rise in current to appear as a corresponding increase in voltage across C5. This latter is achieved by adjusting the values of R25, R26 and C5 which are therefore conveniently preset. In this way the operating time characteristic of an electromagnetic or thermal overload tripping device can be simulated.

The current sensing circuit has a distinct advantage in that the capacitor C5 will be discharged at the instant of switch on, and accordingly switching transients or initial surges of current are not applied to the Schmitt trigger circuit causing the latter to trip the circuit breaker, unless the surge is excessive, due for example to a short circuit. On the other hand, after the circuit breaker has been in the ON-condition for a period of time C5 will have become charged and a very much smaller surge or current overload will be required to increase the voltage across C5 and thereby trigger Q6.

The A.C. load current flowing to the AC load RL is controlled by the two thyristors TH3 and TH4 connected across the D.C. outputs of the two AC bridge circuits, D17–D20 and D21–D24. When either TH3 or TH4, or both, are blocked, no current can flow to the load RL. Since the voltage across each of TH3, TH4 reduces to zero at the end of each half cycle of A.C. current, both TH3 and TH4 have to be continuously triggered by trigger pulses. These are generated by a blocking oscillator Q1 whose output is applied to the gates of TH3, TH4 from the secondary windings of transformer T1 via isolating resistors R6, R7.

Three secondary windings are shown, since the circuit is readily adapted to use with a 3-phase supply by the inclusion of a further A.C. bridge having a Thyristor TH5 (not shown) across its D.C. output which also requires triggering.

The blocking oscillator circuit is similar to that used in the D.C. circuit breaker of FIG. 3 but includes a number of modifications such as the inclusion of diode D2 between the emitter of Q1 and R5. It will be appreciated that in the junction of D2 and R5-referenced 10 in FIG. 4, is held at a negative potential with respect to the other end of R5-reference 11 in FIG. 4, it will be impossible to trigger Q1 and produce an output to fire TH3, TH4. In operation, the blocking oscillator circuit is normally supplied with a regulated negative line voltage of say −12 volts at terminal (9)—(see FIG. 4) and terminal (11) is connected to the positive line of the D.C. power supply. The application of negative line voltage of say −12 volts to terminal (1) see FIG. 4, will cause the circuit to oscillate. However should a negative voltage of say −4v. be applied to terminal (10), Q1 is cut off. Furthermore if this voltage is applied to terminal (10) before the negative collector supply voltage is applied to terminal (1), the circuit cannot be made to oscillate with the subsequent application of the collector supply voltage. Accordingly, it is possible to hold the oscillator circuit in a nonoperative condition from which it cannot be triggered by application of the normal triggering voltage. Use is made of this in the circuit breaker to provide a "lock-out" facility which may be remote controlled.

The two trigger control circuits are substantially identical. Control 1 providing manual Switch-ON (SW1) and Switch-OFF (SW2) and Control 2 providing Reset (SW3) and fault cut-out. SW1 is normally open, and when closed supplies base current to Q3. R28 and R12 are chosen so that Q3 is bottomed and the collector potential is brought approximately to ground potential. The gate of TH1 is normally held negative, but when Q3 bottoms, TH1 is fired, R30 being connected to ground via a link between terminals D and E thereby forming the load for TH1. R30 is chosen so that just sufficient current is drawn through TH1 to maintain conduction. With TH1 conducting C3 charges to nearly line potential and also a negative supply is made available for Q1 collector via terminal (1). Provided conditions are suitable, as described above this will cause Q1 circuit to oscillate and TH3, TH4 will fire, and the circuit breaker thereby switched into its ON state.

The closing of SW1 may be simulated by a remote controlled normally-open switch in parallel therewith or by a negative pulse of appropriate amplitude and duration, applied between terminals (B) and (E), since once TH1 is fired it will remain conducting independent of the switched condition of Q3.

SW2 is also normally open and when closed supplies base current to Q2, R35 and R10 are chosen so that Q2 is bottomed and the voltage across C2 is applied together with the R15 potential drop, across TH1 thereby reverse biasing TH1 and commutating TH1 into its OFF state. With TH1 in its non-conducting, OFF state the negative line supply to Q1 collector is removed and Q1 circuit will cease to produce pulses causing TH3 and TH4 to block at the end of the half-cycle.

Cut out on fault is achieved by Control 2. As previously explained, when the primary current in T3 exceeds a preselected value, Q7 is cut off and base-bias is supplied to the base of Q5. Q5, TH2 and Q4 are connected to operate in the same manner as Q3, TH1 and Q2, respectively, but the negative voltage developed across R31 (corresponding to R3 to Control 1) when TH2 conducts, is applied via R34 to terminal (10) of the blocking oscillator circuit of Q1. If this latter circuit is oscillating it is stopped and any further oscillation is prevented until the voltage at (10) is removed. This is achieved by pressing the reset control switch SW3 which is normally open and corresponds in its operation to SW2 in Control 1.

A fault can be simulated by closing SW4 which applies line negative voltage via R32 to the base of Q5.

Reset after fault can be arranged to automatically switch control 1 into its OFF state, i.e. with TH1 cut off. This may for example be achieved by connecting a diode between terminals (K) and (F) with the anode connected to (F). A current limiting resistor is preferably included in this connection in series with the diode.

Alternatively reset into the ON condition may be achieved by connecting a diode (and series resistor) between terminals (K) and (B) with the anode connected to (B).

The circuit breaker can be adapted for intermittent operation by removing the shorting link shown between terminals (D) and (E). Although TH1 can still be triggered by closing SW1 conduction cannot be maintained if the negative potential is removed from TH1 gate—as for example by opening SW1. Hence the circuit breaker will be switched ON when SW1 is closed and will be switched OFF as soon as SW1 is opened.

Any number of circuit breakers corresponding to FIG. 4 may be linked to a central, master cut-out control whereby all can be operated into their OFF state. To this end terminal 10 on each circuit breaker is extended to a terminal (M) via a diode D16 and all the terminals (M) are connected to a common switch (not shown), by which a negative potential of say −4 volts can be applied to the terminals (M). This common switch, may for example be in a foreman's or manager's office or be associated with a fire alarm or other warning system.

Although the resistance measuring arrangement shown in FIG. 3 is illustrated with the thyristor TH2 connected in series with TH1, it will be appreciated that it is possible alternatively to connect TH2 in parallel with TH1. In such an arrangement, TH2 would be connected in series with a current limiting resistor so that when TH2 is fired only a reduced current flows through the load for the purpose of testing its resistance. Accordingly TH2 may have a very much lower current rating than TH1, which is not the case when they are connected in series and they are both required to carry full load current. As soon as TH1 is fired, it will short circuit the circuit containing TH2 so that TH2 will probably be extinguished.

We claim:

1. A solid state circuit breaker for making and breaking a circuit between a source of current and a load comprising a silicon controlled rectifier; current sensing means; the switching element and current sensing means being connected in series with the load for connection between its load and source of current; first control circuit means including switch means arranged to selectively trigger the silicon controlled rectifier into its conducting and non-conducting states, second control circuit means responsive to an output from the current sensing means which is arranged to trigger the silicon controlled rectifier into its nonconducting state if the current flowing through the current sensing means exceeds a predetermined value; a second silicon controlled rectifier connected in series with the first silicon controlled rectifier and additional control circuit means including resistance measuring means arranged to prevent the second silicon controlled rectifier from conducting if the load resistance is less than a predetermined value.

2. A solid state circuit breaker for making and breaking a circuit between a source of current and a load comprising a silicon controlled rectifier, current sensing means, the silicon controlled rectifier and current sensing means being connected in series for connection between the load and source of current, first control circuit means including switching means arranged to selectively trigger the silicon controlled rectifier into its conducting and nonconducting states and second control circuit means responsive to output from the current sensing means which is arranged to trigger the silicon controlled rectifier into its non-conducting state if the current flow through the current sensing means exceeds a predetermined value, additional current sensing means to detect leakage current between the load and earth and further control circuit means responsive to an output from said additional current sensing means to prevent conduction of the silicon controlled rectifier if the earth leakage current exceeds a predetermined value.

3. A solid state circuit breaker for making and breaking a circuit between a source of current and a load comprising a silicon controlled rectifier, current sensing means, the silicon controlled rectifier and current sensing means being connected in series for connection between the load and source of current, first control circuit means including switching means arranged to selectively trigger the silicon controlled rectifier into its conducting and nonconducting states and second control circuit means responsive to output from the current sensing means which is arranged to trigger the silicon controlled rectifier into its nonconducting state if the current flow through the current sensing means exceeds a predetermined value, a second silicon controlled rectifier connected in series with the first silicon controlled rectifier and additional control circuit means including resistance measuring means arranged to prevent the second silicon controlled rectifier from conducting if the load resistance is less than a predetermined value and additional current sensing to detect leakage current between the load and earth and further control circuit means responsive to an output from an additional current sensing means to prevent conduction of the first mentioned silicon controlled rectifier if the earth leakage current exceeds a predetermined value.

4. A solid state circuit breaker for making and breaking a circuit between an alternating current supply and a load comprising in combination a bridge rectifying circuit for connection in series with the load; load current sensing means comprising a current transformer having its primary connected in series with the load, a bridge rectifier and smoothing circuit connected to the secondary of the transformer and arranged to supply a direct voltage whose magnitude is proportional to the magnitude of the current flowing in the transformer primary and a voltage level detector circuit arranged to produce an output signal to trigger said second control circuit means if the magnitude of the direct voltage applied thereto exceeds a determined value; a silicon controlled rectifier connected across the D.C. output terminal of the bridge rectifier circuit; pulse generating means connected to the gating electrode of the thyristor; first control circuit means arranged to control the operation of the pulse generator and including first switch means for actuating the generator and second switch means for switching off the generator and second control circuit means responsive to an output signal derived from the load current sensing means and adapted to directly switch off the generator and prevent the generator from being actuated if the load exceeds a predetermined value, said second control circuit means including switch means by which the generator can be switched into an operative state after being cut off by an overload, to reset the circuit breaker.

5. A circuit breaker for making and breaking a circuit between a source of alternating current and a load, comprising in combination, a bridge rectifier circuit for connection in series with the load and a solid state circuit breaker as set forth in claim 1 connected between the D.C. output terminals of the bridge rectifier circuit.

6. A circuit breaker arranged to make and break a circuit between an alternating current supply and a load, comprising in combination, a bridge rectifier circuit for connection in series with each line of the alternating current supply and a solid state circuit breaker as set forth in claim 1 connected across the D.C. output terminals of each bridge rectifier circuit.

7. A circuit breaker as set forth in claim 4 wherein the voltage level detector comprises a Schmitt trigger circuit.

8. A circuit breaker as set forth in claim 4 further comprising a resistance and capacitance network connected between the output of the bridge rectifier and smoothing circuit and the input of the voltage level detector, said resistance and capacitance network having a time constant which introduces a time delay of predetermined magnitude to prevent the pulse forming circuit from being triggered by switching transients or initial surges.

9. A circuit breaker as set forth in claim 4 wherein the pulse generating circuit means comprises a blocking oscillator circuit which includes a transistor whose collector supply is controlled by said first control circuit means and whose emitter supply is directly by said second control circuit means.

10. A circuit breaker as set forth in claim 4 further comprising resistance measuring circuit means and further control circuit means arranged to measure the resistance of the load and prevent the silicon controlled rectifier controlling the load current from being fired if the resistance is below a predetermined value.

11. A circuit breaker as set forth in claim 4 comprising a second silicon controlled rectifier; a current limiting resistor connected in series therewith; said second silicon controlled rectifier and the resistor being connected in parallel with the load current carrying silicon controlled rectifier and further control circuit means, arranged to fire said second silicon controlled rectifier before the load current carrying silicon controlled rectifier is fired, to establish a limited currnet through the load by which the resistance of the load can be measured before the full load current is applied.

12. A circuit breaker as set forth in claim 4 wherein a bridge rectifier circuit 15 connected in each line of the alternating current supply and a silicon controlled recetifier is connected across the D.C. output terminals of each bridge rectifier circuit and wherein the output from said pulse generating means is applied to the gating electrode of each silicon controlled rectifier.

References Cited

UNITED STATES PATENTS

| | | | |
|---|---|---|---|
| 3,252,052 | 5/1966 | Nash | 317—18 |
| 3,363,143 | 1/1968 | Cavanaugh | 317—33 |
| 3,365,654 | 1/1968 | Johnston | 323—22 |
| 3,369,154 | 2/1968 | Swain | 317—33 |
| 3,374,420 | 4/1968 | Weber | 323—22 |

J D MILLER, Primary Examiner

H. FENDELMAN, Assistant Examiner

U.S. Cl. X.R.

317—18, 24